United States Patent [19]

Mai et al.

[11] Patent Number: 4,891,231

[45] Date of Patent: Jan. 2, 1990

[54] PROCESS FOR INHIBITING LIQUID OXIDATION IN FOOD

[75] Inventors: Jimbin Mai, New Milford; Laura J. Chambers, New Preston; Richard E. McDonald, Brookfield Center, all of Conn.

[73] Assignee: Nestec S.A., Vevey, Switzerland

[21] Appl. No.: 347,483

[22] Filed: May 4, 1989

Related U.S. Application Data

[60] Division of Ser. No. 65,616, Jun. 30, 1987, Pat. No. 4,839,187, which is a continuation of Ser. No. 620,154, Jun. 14, 1984, abandoned, which is a continuation-in-part of Ser. No. 561,678, Dec. 15, 1983, abandoned.

[51] Int. Cl.$^4$ .......................... A23B 4/14; A23F 3/16; A23L 3/34
[52] U.S. Cl. ..................... 426/52; 426/435; 426/542
[58] Field of Search ............... 426/541, 542, 543, 544, 426/545, 546, 547, 424, 429, 430, 435, 52

[56] References Cited

U.S. PATENT DOCUMENTS

| 699,979 | 5/1902 | Von Rom | 426/332 |
|---|---|---|---|
| 2,085,489 | 6/1937 | Baruth | 426/597 X |
| 2,354,719 | 8/1944 | Verbeck . | |
| 2,768,084 | 10/1956 | Griffith et al. | 426/541 X |
| 2,772,169 | 11/1956 | Hall | 426/541 |
| 3,108,877 | 10/1963 | Cooper | 426/435 X |
| 3,207,666 | 9/1965 | Houtgraf et al. | 426/541 X |
| 3,451,823 | 6/1965 | Mishkin et al. | 426/541 X |
| 3,812,266 | 5/1974 | Sanderman et al. | 426/597 X |
| 3,950,553 | 4/1976 | Gasser et al. | 426/435 X |
| 4,004,038 | 1/1977 | Wickremasinghe | 426/597 X |

FOREIGN PATENT DOCUMENTS

| 688856 | 6/1964 | Canada | 426/435 |
|---|---|---|---|
| 1492754 | 11/1965 | Fed. Rep. of Germany | 426/435 |
| 2047861 | 9/1970 | Fed. Rep. of Germany | 426/435 |
| 46-39058 | 10/1971 | Japan . | |
| 857517 | 12/1960 | United Kingdom | 426/435 |
| 2085274 | 4/1982 | United Kingdom | 426/597 |

OTHER PUBLICATIONS

Lee, Coffee and Tea Trade Journal, vol. 118, No. 5, May 1980, pp. 22, 68, 75–76.

Chakrabarty, et al., "Utilization of Chem. from Tea Waste as Antioxidants for Fatty Materials and Their Nutritional Studies", *Fats, Oils, Relat. Food Prod. Their Prep. Symp.*, 1976, pp. 112–116.

Chem. Abstracts: 67:81289j; 73:33942u; 78:418700; 82:15397b; 85:19104v; 89:161807w; 82:153982q; 89:128039z.

*Primary Examiner*—Arthur L. Corbin
*Attorney, Agent, or Firm*—Vogt & O'Donnell

[57] ABSTRACT

Lipid oxidation in foods is inhibited by incorporating an extract, obtained from black tea leaves having at least 5% by weight of phenol compounds based upon the weight of tea solids in the extract, with a food susceptible to lipid oxidation such that the food contains from 0.005% to 1.5% tea solids by weight based upon the weight of the food. The extracts are obtained by heating an aqueous extract obtained from black tea leaves to a temperature of from 120° C. to 210° C. or by extracting black tea leaves with water at a temperature of from 120° C. to 210° C. Treating the extracts to be incorporated in the food with tannase provides an increase in the antioxidant activity of the extracts.

13 Claims, No Drawings

PROCESS FOR INHIBITING LIQUID OXIDATION IN FOOD

CROSS REFERENCE TO RELATED APPLICATIONS

This is a divisional application of application Ser. No. 065,616, filed June 30, 1987, now U.S. Pat. No. 4,839,187, which is a continuation application of application Ser. No. 620,754, filed June 14, 1984, now abandoned, which is a continuation-in-part application of application Ser. No. 561,678, filed Dec. 15, 1983, now abandoned.

BACKGROUND OF THE INVENTIONS

The present invention relates to antioxidants for food substances, more particularly to antioxidants obtained by the extraction of tea leaves at temperatures of at least 120° C. as in certain processes for the production of instant tea.

Lipid autoxidation occurring in foods has always been a concern for both food processors and consumers and the most common method used to inhibit lipid oxidation is the application of synthetic antioxidants which block the oxidative reactions. However, owing to toxicological and nutritional considerations, only a very few synthetic antioxidants are permitted in food applications, e.g., butylhydroxytoluene (BHT), butylhydroxyanisole (BHA), propyl gallate (PG) and t-butyl hydroquinone (TBHQ). Even these antioxidants are now being examined by regulatory agencies and consumer activists and these developments have urged the need to exploit new sources of natural antioxidants.

One natural product with excellent antioxidant properties, Rosemary AR, suffers from the disadvantage of having a very intensive characteristic herb flavour which may limit its use in some applications.

It is also reported in the literature that certain tea extracts have antioxidant properties, e.g., extracts of tea leaves, tea grounds, tea sweepings and tea wastes, but in all the tea extracts so far described, the antioxidant activity is generally very low and the application of each extract is limited to a restricted class of food materials. As far as we are aware, no study on the antioxidant properties of instant tea or the intermediate extracts produced during its manufacture has been documented.

SUMMARY OF THE INVENTIONS

We have found surprisingly, that in the aqueous extraction of black tea leaves at temperatures from 120° C. to 210° C., certain extracts are formed which contain appreciable quantities of gallic acid. These extracts have an antioxidant activity comparable with or superior to synthetic antioxidant systems, and they do not suffer from the intensive flavour problem of Rosemary AR. In addition, these extracts are effective in a much wider variety of food systems than tea extracts previously described as having antioxidant activity. Unlike conventional antioxidants, they are both oil and water soluble and this property is especially advantageous when the food systems are oil-in-water emulsions and water-in-oil emulsions. Still further, we have also found that these extracts, by soaking uncooked roast beef overnight in a tea extract solution of about 0.25% by weight, are useful in inhibiting the "warmed-over" flavor commonly associated with cooked roast beef which has been reheated.

Accordingly, the present invention provides a composition comprising a food susceptible to lipid oxidation and an extract formed by the aqueous extraction of black tea leaves in a process which includes a treatment at a temperature from 120° C. to 210° C., the amount of extract being such that the content of tea solids present is from 0.005% to 1.5% by weight based on the weight of food, said extract containing at least 5% by weight of phenol compounds based on the weight of tea solids.

Food materials that may be stabilised against oxidation are, for example, frying oils and fats, potato flakes, bakery products, meat emulsions, precooked cereals, instant noodles, soybean milk, chicken products, emulsion products such as sausage, mayonnaise and margarine, frozen fish, frozen pizza, cheese and animal foods.

Instant tea is routinely prepared by the hot water extraction of tea leaves, for example, as described in *World Coffee and Tea*, April 1972, pages 54–57, "The practice of instant tea manufacture". In the present invention, similar extraction conditions used in instant tea manufacture are followed wherein at least part of the extraction of the tea leaves is carried out at a temperature of at least 120° C. to obtain the tea extracts with valuable antioxidant properties. Those extracts as well as the spent tea leaves or residues remaining after extraction, and the instant tea powder have antioxidant properties. For convenience, the word "extract" used in this invention includes the instant tea powder, the spent tea leaves and residues, including tea grounds, tea sweepings and tea wastes, after extraction. The concentrated extracts containing up to 15% tea solids, especially from 4% to 10% tea solids have especially good antioxidant activity.

DESCRIPTION OF PREFERRED EMBODIMENTS

In one particular process of making tea antioxidant, black tea leaves are extracted at a temperature from 80° C. to 130° C. to give an initial extract (Fraction I). The residual leaves are extracted at a temperature from 120° C. to 210° C. and centrifuged to give a second extract (Fraction II). Fraction I and Fraction II are combined and concentrated to give an approximately 5–10% tea concentrate which is cooled and the insoluble tannins separated therefrom to give a water soluble tea liquor (Fraction III). All fractions are further concentrated and dried. Preferably the tea leaves are extracted at a temperature from 100° C. to 125° C. and especially from 105° C. to 120° C., for a period from 10 minutes to 60 minutes to give the initial extract. The residual tea leaves are then milled, slurried and extracted again conveniently for a period from 5 to 60 minutes, preferably from 20 to 40 minutes, at a temperature from 130° C. to 210° C., preferably from 145° C. to 195° C., more preferably from 160° C. to 185° C., and especially from 165° C. to 180° C. Advantageously, the extraction at the higher temperatures is carried out under pressure, the preferred pressures used ranging from 1 bar at 130° C. to 15 bars at 210° C. After this second extraction the tea residue is removed by centrifugation to yield Fraction II. In this process, Fraction I, Fraction II, Fraction III, the residual tea leaves and the ultimately produced instant tea all have significant antioxidant activity, and especially Fraction II and Fraction III.

In particular, appreciable antioxidant activity is possessed by the various extracts, the residual tea leaves and also the instant tea produced in the processes described in U.S. Pat. No. 3,451,823.

Excellent antioxidant activity is obtained when the amount of phenol compounds is at least 5% by weight and preferably at least 8% by weight based on the weight of tea solids.

The major phenolic constituents of the tea solids and the amounts of each usually present in the extracts are gallic acid (0.05 to 1.5%), epicatechin (0.01 to 0.5%), catechin (0.01 to 0.6%), epigallocatechin (0.01 to 0.75%), epicatechin gallate (0.01 to 1.00%) and epigallocatechin gallate (0.01 to 1.5%), all the amounts being given as percentages by weight based on the weight of tea solids. The amount of extract present in the food is conveniently such that the tea solids content is from 0.008 to 1.00% by weight, preferably from 0.02 to 0.75% and especially from 0.05 to 0.5% by weight based on the weight of food. The tea extracts show antioxidative synergism in food either with ascorbic acid or with lecithin. The amount of ascorbic acid or lecithin used in a synergistic mixture may be from 0.02 to 2.00%, preferably from 0.05 to 1.00% by weight based on the weight of food, while the amount of extract is conveniently such that the solids content is from 0.01 to 0.05% by weight based on the weight of food.

In a preferred embodiment of the present invention, the tea extracts may be further extracted with a water-immiscible organic solvent capable of extracting at least a part of the phenol compounds from the extracts, for examle, by partitioning. Examples of such solvents are petroleum ether, pentane, diethyl ether, hexane, ethyl propionate, ethyl acetate, methyl iso-butyl ketone or halogenated hydrocarbonds such as Freons. The extracted phenol compounds may then be separated, for example, by removal of the solvent by rotary evaporation, and reconstituted with water and freeze-dried. Such phenolic-containing extracts have superior antioxidant activity and oil solubility to the tea extracts from which they are extracted.

In another embodiment of this invention, the Fraction I extract may be heated at a temperature from 130° C. to 210° C., preferably from 160° C. to 210° C., for a period of, for instance, 10 to 60 minutes to give an extract with improved antioxidative effectiveness.

In yet another embodiment of the present invention, the tea extracts may be treated with tannase to increase the antioxidant activity. The treatment with tannase is preferably carried out at a pH from 4.0 to 5.5, especially from 4.5 to 5.0. The amount of the tannase used to treat the tea extract is not critical but usually an amount from 0.02% to 1.0% by weight based on the weight of tea solids is effective and conveniently an amount from 0.05% to 0.5% by weight based on the weight of tea extract may be used. The synergistic antioxidant effect with ascorbic acid is especially marked when the tea extracts are treated with tannase, especially at low levels of application, e.g., 0.02% to 0.05% by weight of solids based on the weight of food.

EXAMPLES

The following examples further illustrate the present invention.

EXAMPLE 1

Black tea leaves were extracted at a temperature between 110° C. and 120° C. for 30 minutes to give Fraction I. The residual tea leaves were milled, slurried and then extracted at 190° C. and a pressure of 11 bars for a further 30 minutes. This slurry was centrifuged and the supernatant was recovered as Fraction II. A combination of Fraction I and Fraction II was then concentrated to give a 5–10% tea concentrate which was cooled to a temperature of 15° C. to precipitate the insoluble tannins. The tea liquor was then centrifuged and the insoluble tannins removed to give Fraction III.

Samples of Fraction II and Fraction III, respectively, were incorporated into separate 100 g batches of chicken fat in amounts such that the content of tea solids in each batch was 0.05% by weight based on the weight of the chicken fat. In addition, a mixture of Fracton II and ascorbic acid (AA) was incorporated into a further 100 g batch of chicken fat wherein the amount of Fraction II was such that the content of tea solids in the batch was 0.10% by weight based on the weight of chicken fat and the amount of ascorbic acid was 0.05% by weight based on the weight of chicken fat. As a comparison, 0.01 g of BHA was incorporated in a further 100 g batch of chicken fat. The antioxidative activity was determined by a modified Rancimat Method which is an accelerated oxidation test described by J. Frank, J. Geil and R. Freaso in "Food Technology 1982, Vol. 36, No. 6, p. 71", in chicken fat at 100° C. The oxidative stability of the chicken fat was determined by the induction period (IP), the time required for the fat to become rancid. To facilitate comparison of the data, the antioxidant index (AI), defined as the induction period of the treatment divided by the induction period of the control was used to report the effectiveness of the antioxidants. In the test, frozen chicken fat was melted directly over low heat on a stove top. The test antioxidants were incorporated directly into 100 g samples of the melted fat and homogenised. Ten gram samples of the control chicken fat, and chicken fat containing the antioxidant were then placed in the Rancimat reaction vessels for the accelerated oxidation test. The test temperature was 110° C. instead of 100° C. which is prescribed by the Rancimat Method noted above. This was the only modification made to the Rancimat procedure. The air flow rate was 20 liter/hr. The results are as shown in Table I:

TABLE I

| ANTIOXIDANT | AI |
|---|---|
| Fraction II | 3.6 |
| Fraction III | 5.0 |
| Fraction II and AA | 6.4 |
| BHA | 6.0 |

These results showed that the antioxidant activity of the tea extracts were comparable with that of a commercial synthetic antioxidant.

EXAMPLE 2

Samples of Fraction I, Fraction II, residual tea leaves and Fraction III formed in the process described in Example 1 were incorporated into chicken fat at various concentrations and tested in exactly the same way as described in Example 1. The values of the antioxidant activity (AI) at the various concentrations given as the % content of tea solids present in the chicken fat are shown in Table II:

TABLE II

| Antioxidant | Tea Solids (% Concentration) | | | |
|---|---|---|---|---|
| | 0.05 | 0.10 | 0.50 | 1.0 |
| Fraction I | 1.5 | 1.8 | 3.4 | — |
| Fraction II | 3.6 | 6.2 | 13.2 | 15.6 |
| Residual Tea Leaves | 1.0 | 1.6 | 3.0 | 2.8 |
| Fraction III | 5.0 | 8.0 | 18.0 | 21.7 |

TABLE II-continued

| Antioxidant | Tea Solids (% Concentration) | | | |
|---|---|---|---|---|
| | 0.05 | 0.10 | 0.50 | 1.0 |
| Instant Tea Powder | 1.8 | 2.2 | 4.6 | 7.3 |

No flavour from the tea extracts was imparted to the chicken fat even at 1% concentration.

EXAMPLE 3

Individual samples of Fraction II formed in the process described in Example 1, soy lecithin and mixtures thereof were incorporated into chicken fat at the concentrations indicated in Table III and tested in exactly the same way as described in Example I. The induction period of the chicken fat without additives, the induction period of the chicken fat containing the specified additives, as well as the % synergism of the mixtures of Fraction II and soy lecithin are indicated in Table III.

TABLE III

| Sample | Induction period (hr) | % synergism |
|---|---|---|
| Control | 1.0 | — |
| Fraction II, 500 ppm | 3.0 | — |
| Lecithin*, 500 ppm | 1.2 | — |
| Fraction II, 500 ppm and lecithin, 500 ppm | 4.3 | 33.3 |
| Lecithin, 1000 ppm | 1.4 | — |
| Fraction II, 500 ppm and lecithin, 1000 ppm | 4.9 | 38.5 |

*Centrolex f lecithin, Central Soya
% synergism = 100 [(IM-IL)-(IA-IL)-(IS-IL)]/(IM-IL)
IL = Induction period of substrate
IA = Induction period of primary antioxidant
IS = Induction period of synergist
IM = Induction period of primary antioxidant/synergist

EXAMPLE 4

Samples of Fraction I and Fraction II formed in the process described in Example 1 were each made into 3% aqueous solutions. To each solution were added two volumes of ethyl acetate to form two immisible layers. The organic layer was collected and the procedure of extraction was repeated twice. The pooled organic layer was rotary evaporated and the residue freeze dried. The yield was 31% for Fraction I and 9% for Fraction II.

Samples of Fraction I, Fraction II, the organic extract of Fraction I (Fraction IA) and the organic extract of Fraction II (Fraction IIA) were incorporated into chicken fat at a solids content of 500 ppm and the antioxidant index (AI) was determined as described in Example 1. The results are given in Table IV and illustrate the improved antioxidant activity of the organic extract compared with the aqueous extract.

TABLE IV

| Instant Tea Extract | AI |
|---|---|
| Fraction I | 2.1 |
| Fraction II | 3.8 |
| Fraction IA | 7.8 |
| Fraction IIA | 11.6 |

EXAMPLE 5

A sample of Fraction I formed in the process described in Example 1 was heated at 190° C. for 30 minutes. Samples of Fraction I and the treated Fraction I were incorporated into chicken fat at a solids content of 500 ppm and the antioxidant index measured in the way described in Example 1 was found to be 2.4 for Fraction I and 4.1 for treated Fraction I, an improvement of 70%.

EXAMPLE 6

A sample of Fraction I formed in the process described in Example 1 was mixed for 1 hour at 45° C. and at pH 4.5 with 0.1% by weight based on the weight of Fraction I of tannase obtained from Enzyme Development Company, NY, NY. Samples of Fraction I and the tannase treated Fraction I were incorporated into chicken fat at a solids content of 500 ppm and the antioxidant index measured in the way described in Example 1 was found to be 1.5 for Fraction I and 2.8 for the tannase treated Fraction I showing that the tannase treatment almost doubled the antioxidant activity of Fraction I.

EXAMPLE 7

Samples of Fraction I formed in the process described in Example 1, Fraction I treated with tannase as described in Example 6, and a mixture of 85 parts of a tannase treated Fraction I and 15 parts of ascorbic acid were incorporated into separate samples of chicken fat at a solids content concentration indicated in Table V. The antioxidant index (AI) of each sample was measured in the way described in Example 1 and the values of the AI at the various concentrations are shown in Table V.

TABLE V

| Antioxidant | Tea solids (% concentration in chicken fat) | | | | |
|---|---|---|---|---|---|
| | 0.025 | 0.05 | 0.10 | 0.25 | 0.50 |
| Fraction I | 1.2 | 1.4 | 1.8 | 2.7 | 3.4 |
| Tannase treated Fraction I | 1.6 | 2.5 | 3.4 | 4.6 | 4.7 |
| Tannase treated Fraction I + Ascorbic acid | 3.5 | 4.5 | 4.8 | 5.8 | 7.1 |

These results show that there is excellent synergism between tannase treated Fraction I and ascorbic acid, especially at solids concentrations of 0.025% and 0.05%.

EXAMPLE 8

The effectiveness of Fraction II and solvent extracted Fraction II as prepared in Example 4 of the present invention was tested in pork by mixing each extract at a solids concentration shown in Table VI with 1000 g portions of fresh ground pork in a Hobart Mixer (Model Nr. K5-A) on a setting of 2 for 3 minutes. Fraction II was added to 20 ml water before being mixed with the pork whereas solvent extracted Fraction II was mixed with 2.5 ml ethanol and then incorporated into 20 ml water to aid dispersion. The tea antioxidants of the present invention were compared with the fat soluble antioxidants Rosemary AR and a mixture of BHA and BHT which were also mixed with 2.5 ml ethanol and then incorporated into 20 ml water before adding to the pork. 25 g portions of each batch of pork containing the the antioxidants as well as a 25 g portion of fresh ground pork not containing any added antioxidants were packed in air-permeable plastic films and stored for one week at 4° C. The antioxidant effectiveness was evaluated by a sensory evaluation panel and the results are shown in Table VI.

TABLE VI

| TREATMENT | Rank | Comments |
| --- | --- | --- |
| Control (no additives) | 5 | Spoiled, rancid |
| Fraction II (1000 ppm) | 2 | Fresh meat aroma |
| Solvent extract (500 ppm) | 1 | Fresh meat aroma |
| Rosemary AR (500 ppm) | 4 | Rosemary odour |
| BHA (100 ppm) & BHT (100 ppm) | 3 | Slight off-odour |

EXAMPLE 9

The effectiveness of a solvent extracted Fraction II as prepared in Example 4 of the present invention was tested in both pork and beef at a solids concentration of 250 ppm in 1000 g portions of fresh ground pork and beef. The solvent extracted Fraction II was mixed with 2.5 ml ethanol and then incorporated into 20 ml water before being mixed with the meat in a Hobart Mixer (Model Nr. K5-A) on a setting of 2 for 3 minutes. 25 g portions of each batch of pork and beef containing solvent extract as well as 25 g control portions of pork and beef not containing any added antioxidants were packed in air-permeable plastic films and stored for 8 days at 4° C. The antioxidant effectiveness was evaluated by the chemical TBA (thiobarbituric acid) method following as general guideline, the procedure of Tarladgis et al. 1960. J. Am. Oil Chem. Soc. 37:44. The results given in Table VII show clearly the superior antioxidant activity of the solvent extracts of the present invention.

TABLE VII

| SAMPLE | TBA Value* |
| --- | --- |
| Pork Control | 0.44 |
| Pork + Solvent Extract | 0.22 |
| Beef Control | 1.27 |
| Beef + Solvent Extract | 0.38 |

*mg malonaldehyde per 1000 g sample.

We claim:

1. A process for inhibiting lipid oxidation in a food susceptible to lipid oxidation comprising:
   heating an aqueous extract of black tea leaves at a temperature of from 130° C. to 210° C. and recovering an extract having at least 5% by weight phenol compounds based upon the weight of tea solids in the recovered extract; and
   incorporating the recovered extract in a food susceptible to lipid oxidation such that the food contains from 0.005% to 1.5% tea solids by weight based upon the weight of food.

2. A process according to claim 1 wherein the aqueous black tea extract is heated to a temperature of from 160° C. to 210° C.

3. A process for inhibiting lipid oxidation in a food susceptible to lipid oxidation comprising:
   extracting black tea leaves with water at a temperature of from 130° C. to 210° C. and recovering an extract having at least 5% by weight phenol compounds based upon the weight of tea solids in the recovered extract; and
   incorporating the recovered extract in a food susceptible to lipid oxidation such that the food contains from 0.005% to 1.5% tea solids by weight based on the weight of the food.

4. A process according to any one of claims 1, 2 or 3 further comprising, prior to incorporating the recovered extract into the food, treating the recovered extract with tannase and then incorporating the tannase treated recovered extract into the food.

5. A process according to claim 4 further comprising incorporating ascorbic acid in the food with the tannase treated extract.

6. A process for inhibiting lipid oxidation in a food susceptible to lipid oxidation comprising:
   extracting black tea leaves with water at a temperature of from 80° C. to 130° C. for obtaining a first extract and residual extracted leaves;
   extracting the residual extracted leaves at a temperature of from 130° C. to 210° C. and centrifuging the extracted residual leaves for obtaining a second extract having at least 5% by weight phenol compounds based upon the weight of tea solids in the second extract; and
   incorporating the second extract in a food susceptible to lipid oxidation such that the food contains from 0.005% to 1.5% tea solids by weight based upon the weight of the food.

7. A process according to claim 6 further comprising, prior to incorporating the second extract in the food, treating the second extract with tannase and then incorporating the tannase treated second extract in the food.

8. A process for inhibiting lipid oxidation in a food susceptible to lipid oxidation comprising:
   extracting black tea leaves with water at a temperature of from 80° C. to 130° C. for obtaining a first extract and residual extracted leaves;
   extracting the residual extracted leaves at a temperature of from 130° C. and 210° C. and centrifuging the extracted residual leaves for obtaining a second extract;
   combining and concentrating the first and second extract for obtaining a concentrate having from about 5% to 10% tea solids and having at least 5% by weight phenol compounds based upon the weight of tea solids;
   separating insoluble tannins from the concentrated extract for obtaining a third extract; and
   incorporating the third extract in a food susceptible to lipid oxidation such that the food contains from 0.005% to 1.5% tea solids by weight based upon the weight of the food.

9. A process according to claim 6 or 8 wherein the black tea leaves are extracted at from 100° C. to 125° C. for from 10 minutes to 60 minutes for obtaining the first extract and the residual leaves are extracted at the temperature of from 130° C. to 210° C. for from 5 minutes to 60 minutes for obtaining the second extract.

10. A process according to claim 9 wherein the residual leaves are extracted at a temperature of from 145° C. to 195° C.

11. A process according to claim 9 wherein the residual leaves are extracted at a temperature of from 160° C. to 185° C.

12. A process according to claim 8 further comprising, prior to incorporating the third extract in the food, treating the third extract with tannase and incorporating the tannase treated third extract in the food.

13. A process according to claim 7 or 12 further comprising incorporating ascorbic acid in the food with the tannase treated extract.

* * * * *

UNITED STATES PATENT AND TRADEMARK OFFICE
CERTIFICATE OF CORRECTION

PATENT NO. : 4,891,231
DATED : January 2, 1990
INVENTOR(S) : Jimbin MAI, et al.

It is certified that error appears in the above-identified patent and that said Letters Patent is hereby corrected as shown below:

On the title page, in the title, "LIQUID" should be --LIPID--.

Under the heading "Reference Cited U.S. PATENT DOCUMENTS", "Houtgraf" should be --Houtgraaf--.

Column 8, line 32 (line 7 of claim 8), "and" should be --to--.

Signed and Sealed this

Sixteenth Day of October, 1990

Attest:

HARRY F. MANBECK, JR.

*Attesting Officer*     *Commissioner of Patents and Trademarks*